No. 612,195. Patented Oct. 11, 1898.
T. L. CORWIN.
BICYCLE CHECKING AND SECURING FRAME.
(Application filed Nov. 13, 1897.)
(No Model.)
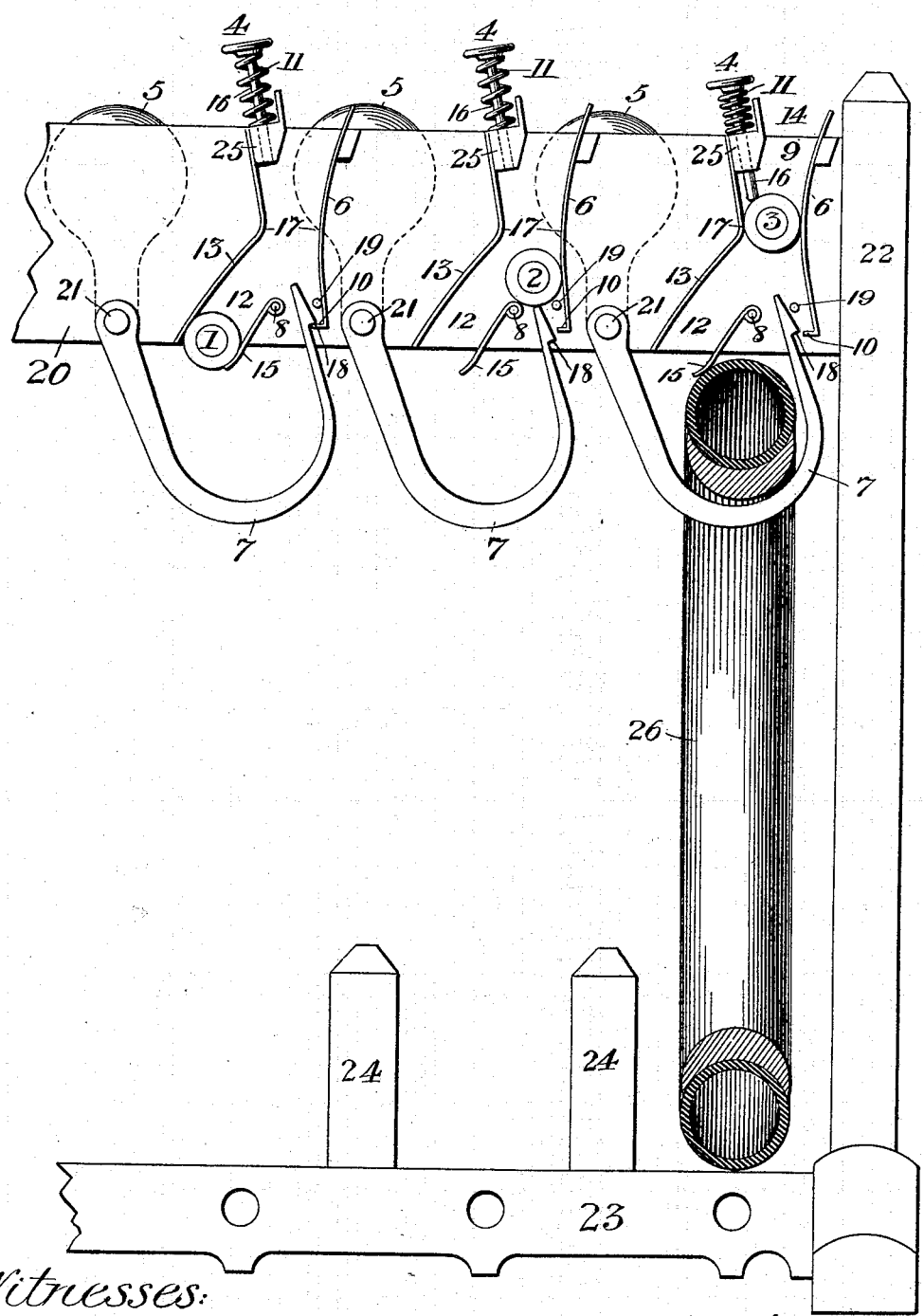
Witnesses:
Chas. A. Skinner
Henry B. Napier
Inventor
Theodore L. Corwin

UNITED STATES PATENT OFFICE.

THEODORE L. CORWIN, OF HOMER, NEW YORK.

BICYCLE CHECKING AND SECURING FRAME.

SPECIFICATION forming part of Letters Patent No. 612,195, dated October 11, 1898.

Application filed November 13, 1897. Serial No. 658,384. (No model.)

*To all whom it may concern:*

Be it known that I, THEODORE L. CORWIN, a citizen of the United States, residing at Homer, in the county of Cortland and State of New York, have invented a new and useful Bicycle and Package Checking and Securing Frame, of which the following is a specification.

My invention relates to and provides for a checking and securing frame for bicycles and other objects; and the objects of my invention are, first, to provide a frame that shall hold securely a bicycle or other object; second, to provide against theft and to enable the owner or the one using the frame to identify the bicycle or other object easily and also to secure possession of the same easily and without confusion. I attain these objects by mechanism illustrated in the accompanying drawing, in which the view is an elevation of the right-hand portion of a frame with the front plate of the coin-controlled apparatus removed.

My frame has a horizontal support 20 for the coin-controlled mechanism. This support is secured at its ends in vertical posts 22, only one being shown. Near the bottom of the posts 22 is provided a horizontal support 23 for the bicycle-wheel 26, (shown in vertical section.) The wheels are separated on the support 23 by short vertical pins 24, as shown. Near the lower edge of support 20 a series of rock-shafts 21 are transversely mounted. On one end of the rock-shaft 21 is secured one end of a U-shaped or hook clasp, whose free end is provided on its outer edge with a shoulder or notch 18. The other end of the rock-shaft is provided with a counterbalancing weight or ball 5 within reach of the user of the frame.

14 represents a coin-slot in the top of the frame 20, which slot leads into the upper portion 9 of the coin-chute. One wall 13 of this chute is rigid and bent to form an angle 13ª, the upper portion thereof inclining to contract the width of the chute and the lower portion inclining in the opposite direction. The other wall of the chute is formed by the spring-guide 6, which curves so as to contract the chute at a point opposite the angle 13ª of the wall 13 to form a throat 17, the chute at said point being so far contracted that a coin or token which falls down the portion 9 of the chute will rest at the throat 17. The lower end of said guide 6 is provided with a hook or detent 10, which when the shoulder or notch 18 is introduced into the support engages under the shoulder 18 and prevents the swinging of the clasp outwardly.

19 is a stop which limits the action of the spring-guide, whose normal tendency is to contract the coin-chute.

16 is a push-rod guided in a support 25 and having its lower end just above the upper edge of a token seated in the throat 17. A spring 11 surrounds the upper portion of the pusher 16 and is seated between the support 25 and the head 4 of the pusher, the spring 11 serving normally to urge the pusher upwardly.

15 is a spring token guide and holder which lies substantially parallel with the lower portion of the wall 13 of the coin-chute. The upper end of the guide and holder 15 is secured to a pin 8, below and slightly to the left of the center of the token when in the throat 17, the free end of the guide and holder being curved so as to contract the passage 12 and hold a token from escaping. The lower edge of the token when so held projects below the frame 20 and can be easily removed by the user of the frame.

1, 2, and 3 represent a series of tokens or checks in the different positions which they assume. 1 shows the position of the token or check when the clasp has just been locked about a cycle-wheel rim by the detent 10, the check being within reach of the user, who removes the same and carries it away with him. When he desires to free his cycle, he deposits the check in the slot 14, whence it rolls down the portion 9 of the coin-chute and rests at the throat 17. 3 is a check in this position. If now the pusher 16 be pushed in, the token will be forced down, pushing the spring-guide 6 aside, and withdrawing the detent 10 from the shoulder 18 of the clasp. The wheel can now be removed. The token drops down so as to rest between the pin 8 and the guide 6, where the token 2 is shown as resting.

When the clasp 7 is rocked by using the weight as a handle, so that the shouldered end of the clasp enters the support 20, its upper end strikes the bottom edge of the token and rolls it down the portion 12 of the chute—that is, the token rolls from the position shown at 2 to that shown at 1.

What I claim is—

In a bicycle and package holding frame, the combination of a suitable support, a counterbalanced clasp having a shoulder or notch at its free end, a chute having for one wall a spring-guide forming with the opposite wall of the chute an entering-passage and a yielding retaining-throat for a token or check, said spring-guide having a detent to engage said shoulder or notch at the free end of the clasp, a pusher to force the token through the yielding retaining-throat to unlock the clasp, and a detaining-spring to hold the token till taken by the user, substantially as set forth.

THEODORE L. CORWIN.

Witnesses:
A. E. BIRCH,
V. W. MIDDLETON.